United States Patent [19]
Couture et al.

[11] 3,837,833
[45] Sept. 24, 1974

[54] HEATED COVER PROTECTOR FOR PRESS BENDING BLOCK

[75] Inventors: Gerard Couture, Oshawa, Ontario; Leo H. Lindberg, Whitby, Ontario, both of Canada

[73] Assignee: PPG Industries, Inc., Pittsburgh, Pa.

[22] Filed: June 12, 1972

[21] Appl. No.: 261,952

[30] Foreign Application Priority Data
Nov. 2, 1971  Canada................................ 126674

[52] U.S. Cl........................ 65/288, 65/106, 65/287
[51] Int. Cl............................................ C03b 23/02
[58] Field of Search............. 65/106, 273, 275, 288, 65/287

[56] References Cited
UNITED STATES PATENTS
3,328,151  6/1967  Richardson........................ 65/106 X
3,420,652  1/1969  Seymour............................ 65/106 X
3,713,798  1/1973  Stilley et al........................ 65/273 X Primary Examiner—Robert L. Lindsay, Jr.
Attorney, Agent, or Firm—Cushman, Darby & Cushman

[57]  ABSTRACT

A press bending member having a shaping surface of predetermined contour covered with a flexible cover member which tends to wear rapidly in certain areas is provided with metal cover protectors to eliminate wear in said areas. The metal cover protectors are heated by passing electrical currents therethrough to eliminate any tendency for thermal shock to occur in glass sheets contacting the same during press bending operations.

15 Claims, 5 Drawing Figures

3,837,833

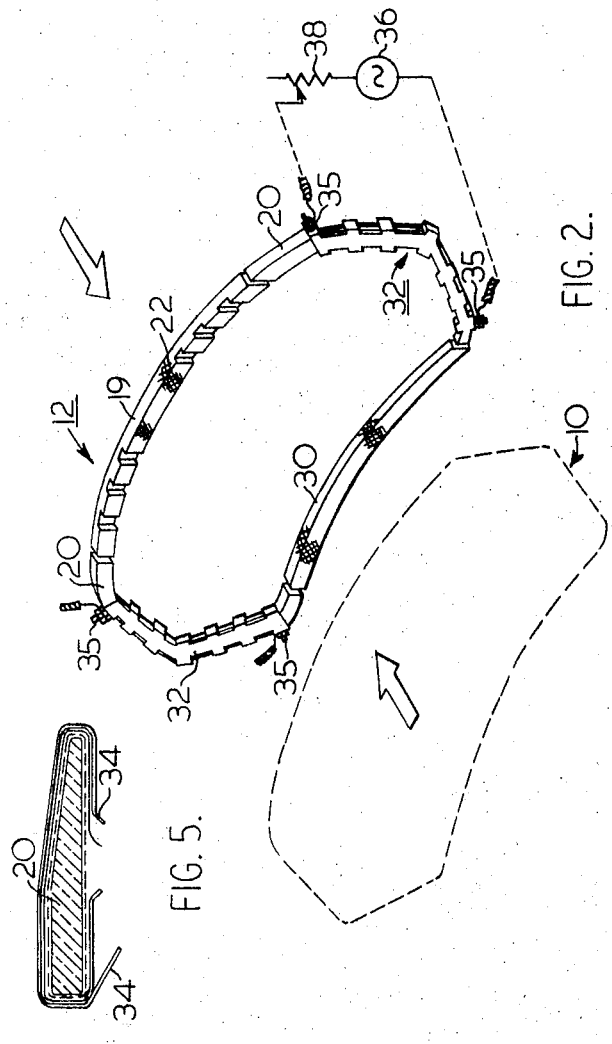

— 1 —

HEATED COVER PROTECTOR FOR PRESS BENDING BLOCK

BACKGROUND OF THE INVENTION

This invention relates to improvements in apparatus for press bending heat softened glass sheets to predetermined shapes.

As is well known, the press bending of glass sheets involves the steps of heat softening glass sheets in a heating furnace, removing the sheets from the furnace and, while the sheets are still hot enough to be deformed, engaging each sheet in pressurized relation between a pair of press bending members having shaping surfaces arranged to complement each other whereby to impart the desired shape to each glass sheet. Thereafter, the press bending members are separated and the shaped sheet quenched by directing cooling air against opposing surfaces thereof.

The shaping surfaces of the press bending members are usually covered with a heat resistant fabric (e.g., fibre glass cloth) to prevent direct contact between the shaping surfaces and the glass whereby to prevent undesirable marring of the glass.

While the heat resistant fabrics employed solve to a large extent the problem of glass surface marking, such fabrics, due to the pressures, temperatures, frictional and bending forces encountered thereby, tend to wear through in places thus allowing the hot glass to come into contact with the relatively cool metal of the press bending member and causing chill cracking of the glass. To correct this condition, replacement of the entire cover was required. This need for replacement gives rise to high costs due to the machine down time, labour and materials involved.

It is well known that the bulk of the wear of the covering fabrics is of a localized nature, the region of wear being determined by the configuration of the press bending member on which it is applied. For example the cover material adjacent the marginal edges of the shaping surfaces of the female (concave) press bending member wears much more rapidly than any part of the material on the male (convex) member. This tendency to rapid cover wear is greatly accentuated on female members of the ring-type variety particularly those having hinged wing portions at the opposing ends thereof; this is presumably due to the fact that during shaping there is a certain amount of relative movement between the glass surface and the cover over these wing portions.

BRIEF SUMMARY OF THE INVENTION

One object of the present invention is to provide protector means overlying at least those portions of the mold shaping surface where rapid cover wear tends to occur to obviate the need for frequent cover replacement.

In a typical embodiment of the invention, these protector devices comprise flexible metal plates fastened to the shaping member over those regions of the shaping where rapid cover wear previously created a problem. The metal protectors are insulated from the relatively massive mold member by a suitable insulating material, such as glass fiber tape or cloth, to assist in protecting the glass from thermal shock, and also to cushion the metal protector to assist in avoiding damage to the glass surface during pressurized engagement of same between the mold shaping surfaces.

By providing these metal protectors, the need for cover replacement due to localized cover wear is substantially reduced and the incidence of chill cracking of the hot glass caused by the latter contacting the bare metal press member is reduced accordingly.

A further feature of the invention provides means for effecting heating of the protector devices to reduce any tendency of the protectors to cause thermal shock to the glass by virtue of the tendency of the metal protectors under certain heat conditions to absorb heat from the glass portions contacting same during press bending at a higher rate than heat is absorbed from adjacent portions of the glass. The need for heating the metal protectors is usually greatest at the start of a run before the hot glass has had an opportunity to heat the protectors to a suitable temperature.

In a typical embodiment of the invention, the heating means comprises means for passing electrical currents through the metal protectors to retain same at a temperature sufficient to reduce the incidence of thermal shock damage. In this case, the previously mentioned insulating material underlying the metal protector plate also functions as an electrical insulator.

In the preferred form of the invention the heated metal cover protectors are located on the hinged end wing sections of female ring type press bending members, the fabric covers on these portions of the shaping member being highly susceptible to wear.

BRIEF DESCRIPTION OF THE VIEWS OF DRAWINGS

The invention will be better understood from a reading of the following description of a preferred embodiment of same reference being had to drawings wherein:

FIG. 2 illustrates the invention as applied to the wing sections of a ring type female press bending member;

Figure 4:
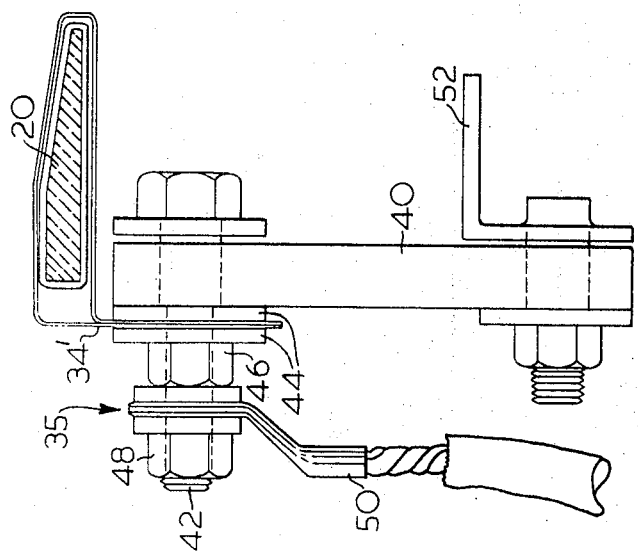
Figure 3:
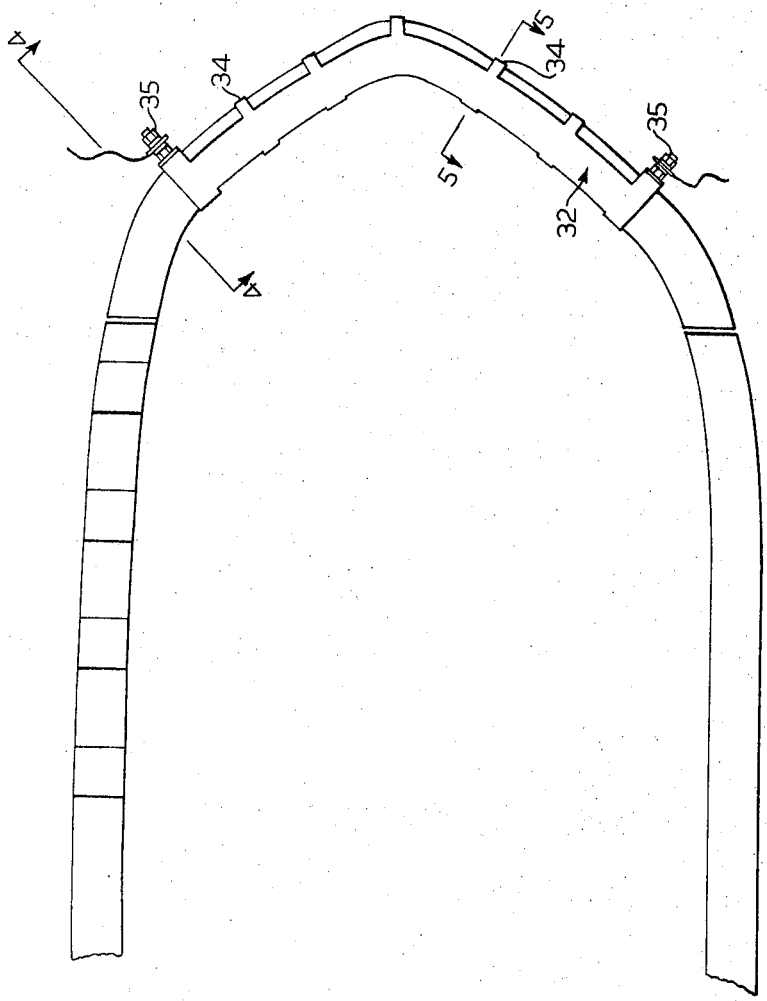
FIG. 3 is a plan view of one end of the press bending member of FIG. 1.

FIGS. 4 and 5 are section views along lines 4—4 and 5—5 of FIG. 3 respectively.

DETAILED DESCRIPTION OF THE PREFERRED EMBODIMENT

Figure 1:
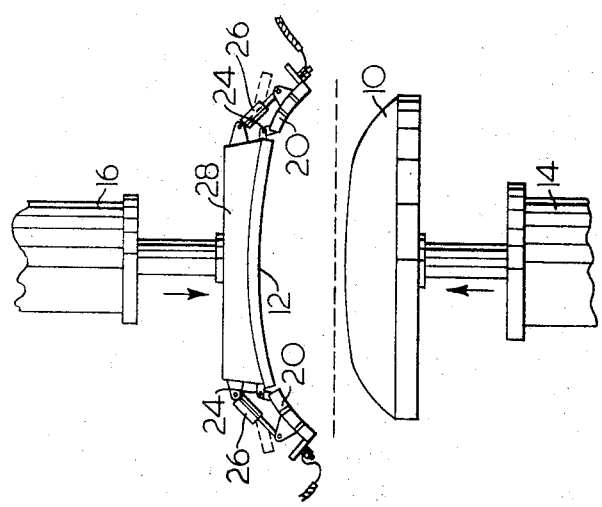
FIG. 1 is a diagrammatic plan view of typical press bending apparatus incorporating the present invention.

With reference to FIG. 1 there are seen male and female press bending members 10 and 12 mounted for movement towards and away from one another in the fashion well known in the art. Actuating cylinders 14 and 16 serve to effect said movement of the press bending members and are capable of exerting sufficient thrust as to effect press bending of a sheet of heat softened glass of the proper outline contour suspended therebetween on tongs supports (not shown) during a press bending operation.

The female press member 12 is of the ring or outline type variety and includes a pair of end wing sections 20 which are pivotally connected to the main body or centre section 22 of member 12 by means of hinges 24 (see FIG. 1). Wing sections 20 are caused to pivot from the broken line positions to the full line positions shown in FIG. 1 by means of hydraulic actuating cylinders 26 interconnected in suitable fashion between the support 28 for the female member 12 and the respective wing sections 20. In operation, cylinders 26 are actuated part way through the actual bending cycle so as to bring all parts of the sheet G into full conformity with the shaping surface of the male press bending member 10 with the marginal edges of the sheet G being engaged in pressurized relation between the complementary shaping surfaces of the press bending members 10 and 12.

The convex shaping surface of the male member 10 is covered with a layer of woven or knit fibre glass cloth. The ring-type female member 12 is also provided with fibre glass cloth such that its shaping surface 30 is covered thereby.

The fibre glass covering serves to prevent direct contact of the glass with the bending members and reduces risk of glass marring.

In the arrangement shown, the fibre glass coverings for the shaping surfaces of the wing sections 20 of the female press bending member are particularly prone to rapid wear during press bending operations. For this reason they are each provided with cover protector plates 32. Each protector plate, as best seen in FIG. 3, is in the form of a strip of thin stainless steel contoured in plan to match the shape of the wing section shaping surface on which it is located. The overall length of each protector plate 32 is sufficient as to overlie those portions of the fibre glass covering which would otherwise be rapidly worn away during use. The protector plates have tabs 34 attached to their opposing edges which are bent partly around the wing section 20 to retain the protector plate in place. The tabs 34 embrace wing section 20 rather loosely so as to permit a small amount of up and down movement, say 1/32 inch, of the protector plates. In addition this clearance permits thermal expansion and contraction of the protector plates 32 without fear of buckling of same. Since the fibre glass covering completely surrounds the wing section the protector plates are electrially insulated thereby from the press bending member.

For best results, the fibre glass beneath the protector plates 32 is actually applied in the form of a 1 inch wide tape wound around the shaping member with a ½ inch overlap, such tape winding extending ½ to 1 inch beyond the ends of plate 32. A layer of heavy fibre glass cloth is then applied over the wound on tape. This combination yields an excellent thermal and electrical insulating effect and ensures a good cushioning effect during press bending, thus eliminating any tendency of the protector plate to imprint the glass surface. Care should be taken in the application of the tape and cloth adjacent the ends of the protector plate to eliminate any "step" effect at the extreme ends of plate 32 which might tend to mark the glass.

The protector plate 32 is of a corrosion resistant metal and good results have been obtained with Type 302 or 304 rolled stainless steel sheet. No special treatment of the surface of this commercially available stock sheet is required. The thickness of the protector plates 32 is dictated by practical considerations. If the metal is made too thin, it will buckle under the influence of the heat and pressure encountered during press bending. If made too thick, the glass may be imprinted; furthermore the plate 32 should be thin enough to deflect sufficiently at the points of highest pressure as to avoid over stressing the glass sheet and to permit one to take advantage of the cushioning effect of the underlying layers of fibre glass tape and cloth. In general it is believed that good results can be obtained with plate thicknesses from 0.010 inch to about 0.020 inch.

The protector plates 32 are provided with means enabling the same to be heated during use to reduce any tendency for the glass to break due to thermal shock occuring at the time of glass contact therewith. To achieve this, each of the ends of the protector plates 32 are provided with electrical terminals 35, the latter being connected in circuit to a source of current 36 via a current control means 38. By passing the required amount of current through the protector plates 32 the latter can be maintained at temperatures sufficient to avoid venting or breakage of the glass due to thermal shock of the glass coming in contact therewith. The optimum temperature for protector plates 32 will vary from installation to installation; however for most application the protector plates should be maintained at temperatures between 350°-450°C.

The terminals 35 are best shown in FIG. 4. It will be seen that each of the ends of the protector plates 32 are provided with apertured tabs 34' of a length sufficient as to enable them to extend completely around the wing section. The ends of these apertured tabs are secured to a terminal block 40 of electrically insulating material by bolt 42 which passes through block 40 and through the apertures in the ends of tabs 34'. The apertured tabs 34' are disposed between a pair of stainless steel washers 44 and secured there by nut 46, to provide good electrical contact. Since terminals 35 are not directly attached to the wing section some endwise movement of the protector plates 32 under the influence of thermal expansion forces is permitted whereby to avoid buckling of same. A further nut 48 serves to secure the end 50 of an electrical cable to the terminal assembly. The terminal block 40 itself is rigidly secured to the support 28 for the female member 12 by a suitable shaped bracket 52. As the female press bending member moves back and forth the electrical cables which supply heating current to the protector plates 32 flex to the degree determined by the extent of such movement.

Example

In an illustrative example, tong supported glass sheets were heated in a conventional heating furnace and conveyed in step-by-step fashion to a shaping station and thence to a quenching station. The glass surface temperature at the shaping station was about 650°-680°C. The male (convex) shaping member was outfitted with a conventional fibre glass cloth cover while the female shaping member, which was of the ring or outline type variety having pivotted wing sections, was also provided with an insulating cover as described herein. The shaping surfaces of the wing sections of the female member were outfitted with stainless steel protector plates each having a length of about 14 inches, a width of about 1 ½ inches and a thickness of about 0.014 inches. An A.C. current, controlled by a variable output transformer, of about 130 amps. was passed through the protector plates thus maintaining their temperatures somewhere between 350° and 450°C. Excellent results were achieved. No noticeable damage to the glass surfaces resulted from the use of the protector plates and the operation continued for over one week until a shut-down was necessitated for reasons other than cover wear.

Prior art molds of the type referred to above could be kept in operation for only about 45 minutes at a time until cover repair or replacement was required because of the fact that the fibre glass cloth wore through so rapidly. The tremendous improvement resulting from the use of the protectors of the present invention has reduced machine down time to a small fraction of the previous figure and has enabled a substantial increase in production rate to be achieved.

A specific embodiment of the invention has been described. Many variations may be made within the scope of the invention as defined in the following claims.

We claim:

1. Apparatus for use in the press bending of glass sheets comprising a press bending member having means defining a shaping surface adapted to complement the shaping surface of a further press bending member such as to impart the desired shape to a heat softened glass sheet when the latter is engaged in pressurized relation between said press bending members, said shaping surface of the first mentioned press bending member having a flexible heat resistant covering thereon, one or more areas of said heat resistant covering being more susceptible to wear than other areas of the cover, a relatively thin flexible metal protector means comprising a plate overlying at least said one or more areas of said covering to protect same against wear, said thin metal plate being mounted on said shaping surface in such manner as to permit thermal expansion thereof relative to said shaping surface without buckling, wherein said metal cover protector means has a tendency to absorb heat from said glass sheet portions coming in contact with same at a greater rate than heat is absorbed from other portions of the glass thus tending to cause thermal stresses in the glass, and means for effecting sufficient heating of said metal cover protector means so as to substantially reduce any tendency of the latter to cause breakage of the glass sheets as a result of thermal stressing during bending.

2. Apparatus according to claim 1, wherein said metal plate has a thickness from about 0.010 inch to about 0.020 inch.

3. Apparatus according to claim 1, wherein said means for heating said metal protector means includes means for passing an electrical current through said metal protector means to maintain same at a temperature sufficient to avoid breakage of the glass coming in contact therewith due to thermal shock.

4. Apparatus according to claim 1, wherein said first mentioned press bending member is of the ring or outline variety.

5. Apparatus according to claim 3, wherein said first mentioned press bending member is of the ring or outline variety.

6. Apparatus according to claim 1, wherein said first mentioned bending member is of the ring or outline variety and includes wing sections pivotally connected to opposing ends thereof, said protector means being located on said wing sections.

7. Apparatus according to claim 3, wherein said first mentioned bending member is of the ring or outline variety and includes wing sections pivotally connected to opposing ends thereof, said protector means being located on said wing sections.

8. Apparatus according to claim 1, wherein said first mentioned bending member has a shaping surface of generally concave configuration.

9. Apparatus according to claim 6, wherein said first mentioned bending member has a shaping surface of generally concave configuration.

10. A press bending member for shaping heat softened glass sheets having relatively rigid means defining a shaping surface, a layer of insulating material overlying said shaping surface, a thin flexible metal plate overlying at least a portion of said insulating material to protect said portion against rapid wear, said metal plate being mounted to permit it to expand relative to said mold under the influence of thermal expansion forces, and means for heating said metal plate to reduce thermal shock in hot glass containing same.

11. A press bending member according to claim 10, wherein said flexible insulating material comprises fibre glass fabric.

12. A press bending member according to claim 10, wherein said metal plate is mounted to permit it to expand relative to said mold under the influence of thermal expansion forces.

13. A press bending member according to claim 10 wherein said metal plate is 0.010 to 0.020 inches thick.

14. A press bending member of the outline type defining an outline shaping surface of predetermined contour, a layer of flexible insulating material overlying said outline shaping surface, an area of said insulting material being subject to rapid localized wear, and a thin flexible metal plate overlying at least said area of said insulating material which is subject to localized wear, said metal plate being relatively loosely secured to said bending member so that it is free to expand and contract relative to said bending member under the influence of large temperature changes without buckling, wherein said metal cover protector means has a tendency to absorb heat from said glass sheet portions coming in contact with same at a greater rate than heat is absorbed from other portions of the glass thus tending to cause thermal stresses in the glass, and means for effecting sufficient heating of said metal cover protector means so as to substantially reduce any tendency of the latter to cause breakage of the glass sheets as a result of thermal stressing during bending.

15. Apparatus for use in the press bending of glass sheets comprising a press bending member having means defining a shaping surface adapted to complement the shaping surface of a further press bending member such as to impart the desired shape to a heat softened glass sheet when the latter is engaged in pressurized relation between said press bending members, said shaping surface of the first mentioned press bending member having a flexible heat resistant covering thereon, one or more areas of said heat resistant covering being more susceptible to wear than other areas of the cover, a relatively thin flexible metal protector means comprising a plate overlying at least said one or more areas of said covering to protect same against wear, said metal cover protector means having a tendency to absorb heat from said glass sheet portions coming in contact with same at a greater rate than heat is absorbed from other portions of the glass thus tending to cause thermal stresses in the glass, and means for effecting sufficient heating of said metal cover protector means so as to substantially reduce any tendency of the latter to cause breakage of the glass sheets as a result of thermal stressing during bending.

* * * * *

UNITED STATES PATENT OFFICE
CERTIFICATE OF CORRECTION

Patent No. 3,837,833    Dated September 24, 1974

Inventor(s) Gerard COUTURE and Leo H. LINDBERG

It is certified that error appears in the above-identified patent and that said Letters Patent are hereby corrected as shown below:

Col. 1, line 62, before "where", insert --surface--

Signed and sealed this 21st day of January 1975.

(SEAL)
Attest:

McCOY M. GIBSON JR.
Attesting Officer

C. MARSHALL DANN
Commissioner of Patents